Patented May 30, 1939

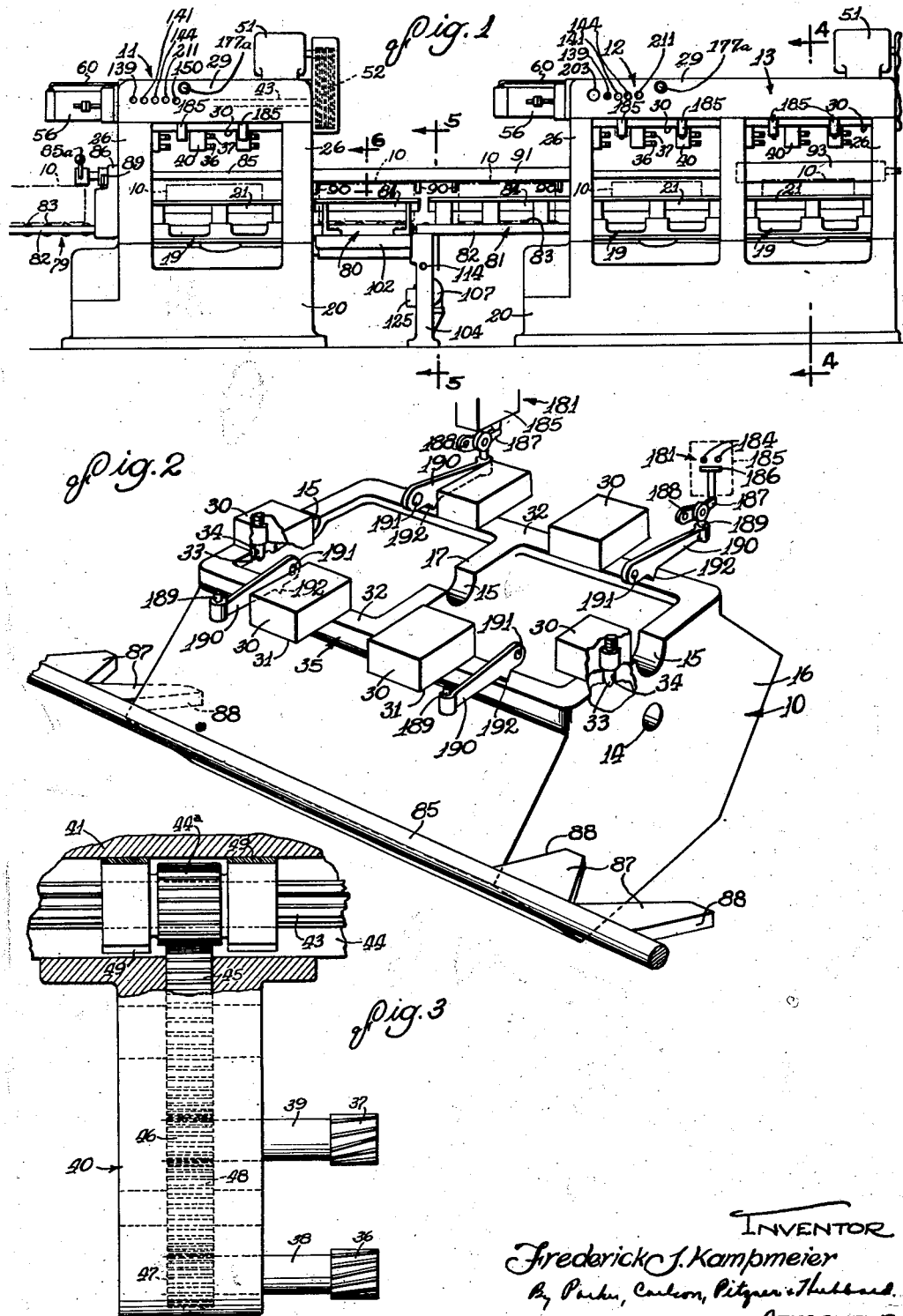

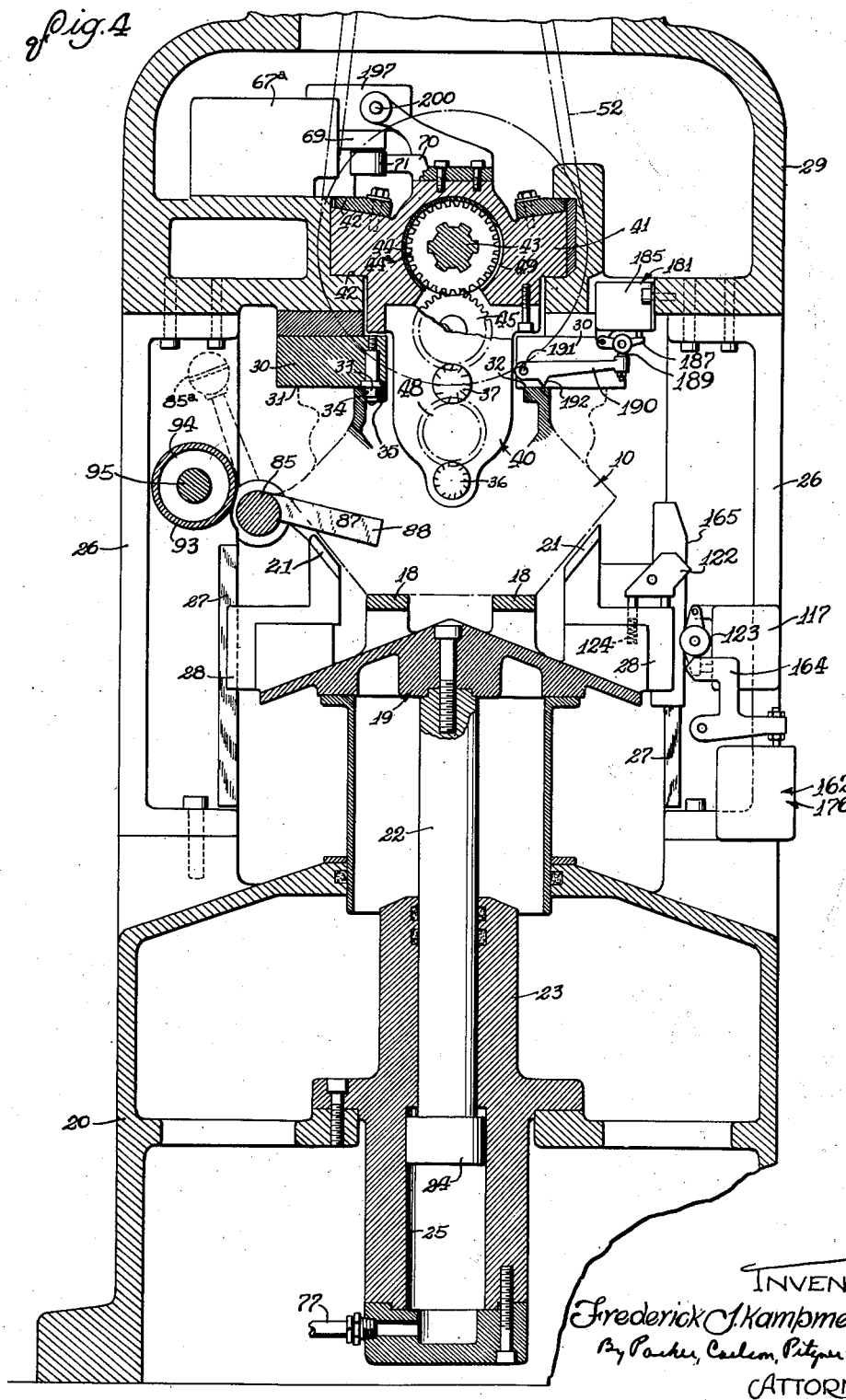

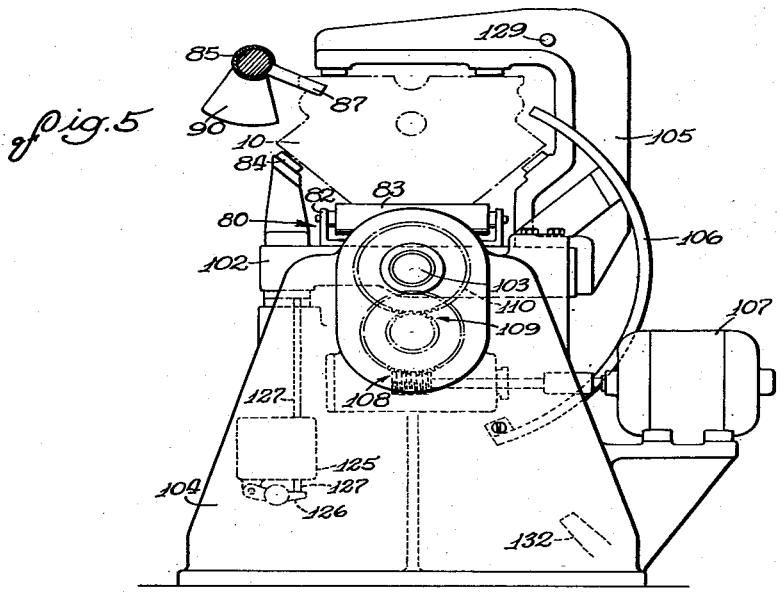
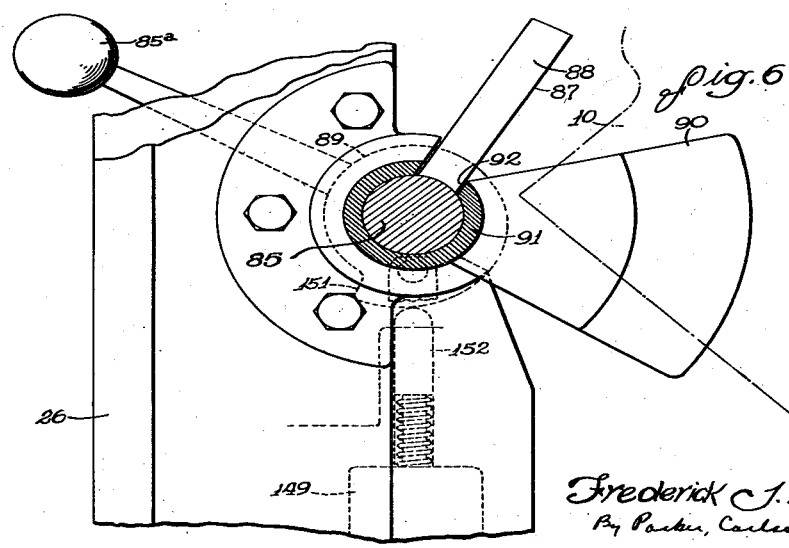

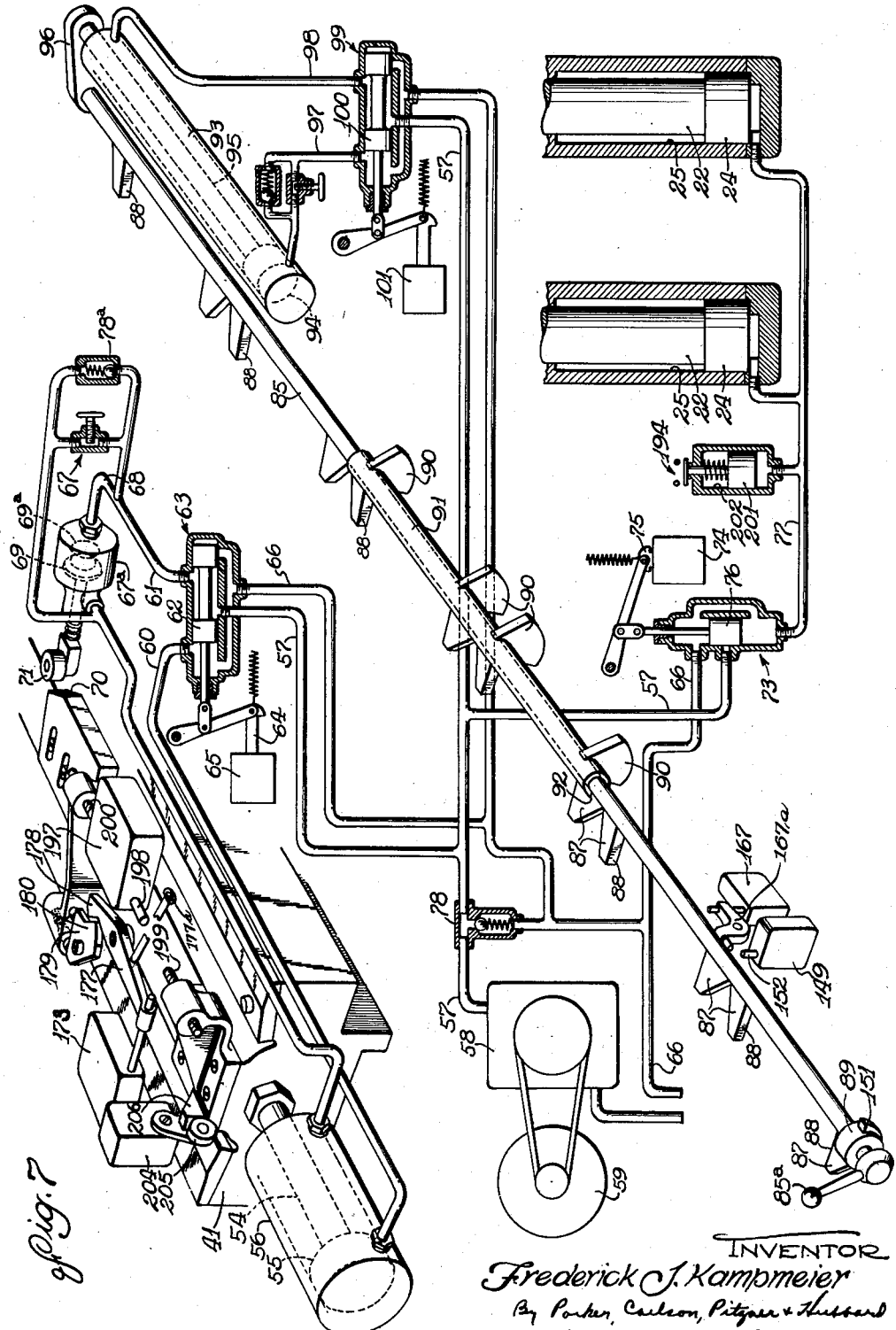

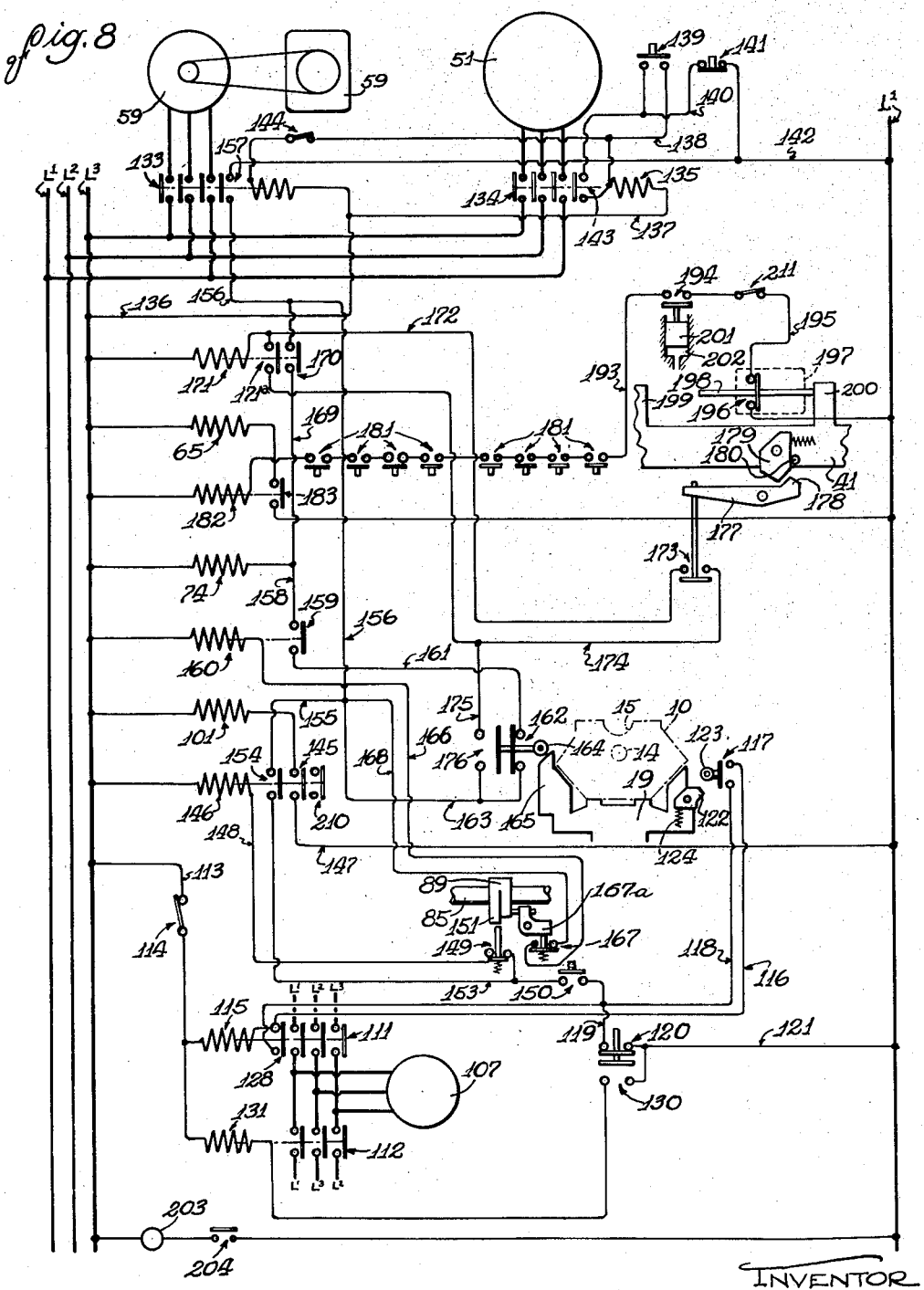

2,160,476

UNITED STATES PATENT OFFICE 2,160,476

MACHINE TOOL

Frederick J. Kampmeier, Rockford, Ill., assignor to The Ingersoll Milling Machine Company, Rockford, Ill., a corporation of Illinois Application April 22, 1936, Serial No. 75,857

15 Claims. (Cl. 77—3)

This invention relates to general purpose machine tool organizations, particularly those of the type in which work pieces are transferred into a machine tool proper, accurately located and clamped in working position, and then machined by mechanisms which operate sequentially in a predetermined substantially automatic cycle.

One object is to provide, in a machine tool organization of the above general character, a novel means for detecting correct and accurate positioning of the work piece to be machined and disabling the relative tool and work feeding mechanism until such positioning has taken place.

A more detailed object is to provide a novel means for detecting the presence of foreign matter such as chips or the like between the work piece and the means for locating the same in working position.

Another object is to provide a new and improved mechanism for transferring the work pieces to the machine tool proper.

The invention also resides in the novel manner in which the work transferring, clamping and feed mechanisms are interrelated to insure operation in proper sequence and at optimum production capacity.

Other objects and advantages of the invention will become apparent from the following detailed description, taken in connection with the accompanying drawings, in which Figure 1 is an elevational view of a multiple machine tool assembly embodying the features of the present invention.

Fig. 2 is a fragmentary perspective view of one of the work pieces and certain parts of the machine control mechanism.

Fig. 3 is a fragmentary sectional view of Fig. 4 showing the cutter driving means.

Fig. 4 is a vertical sectional view taken along the line 4—4 of Fig. 1.

Fig. 5 is a vertical sectional view taken along the line 5—5 of Fig. 1, the work conveyor being omitted.

Fig. 6 is an enlarged fragmentary sectional view taken along the line 6—6 of Fig. 1.

Fig. 7 is a schematic view of the hydraulic controls.

Fig. 8 is a schematic view of the electric controls.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustrating the invention, I have shown in the drawings a machine tool assembly of the type in which roughing, semi-finishing and finishing operations are performed on work pieces 10 in a plurality of separate machines or stations 11, 12 and 13 which are spaced along a horizontal conveyor or slideway along which the work pieces are advanced step-by-step by a power actuated transfer mechanism. In each station, the work piece is elevated from the slideway and pressed against plates and thus located accurately in working position in which it is clamped while being operated on by tools on movable heads. Finally the piece is lowered onto the conveyor and advanced to the next station.

In certain of its aspects, the present invention has to do more particularly with the provision, in a machine of the above general character, of a novel means for insuring location of the work pieces with a high degree of accuracy preparatory to machining in spite of the presence of chips or foreign matter that may come onto the work pieces and the possibility of accidental displacement thereof. The invention is also concerned with the construction of the work transfer mechanism and with the novel manner in which the power operated transfer, elevating and tool feeding mechanisms in all of the different stations are intercontrolled so that the movements of the actuated parts occur in proper time sequence.

In the present instance, the machine at the roughing station is of the same general construction as the finishing machines so that a description of the latter machines will suffice. Each machine is arranged to bore simultaneously the cam shaft holes 14 and the half bearing recesses 15 for the crank shaft bearings in the end walls 16 and cross web 17 in an engine block of the V-type. It will be understood, however, that the invention is not limited to this type of work but may be applied to a wide variety of different metal-removing processes.

Preferably, each block 10 while being operated upon is supported in inverted position by hardened skid plates 18 (Fig. 4) on a table or platen 19 mounted for vertical movement in a base structure 20. Inclined side rails 21 rigid with and upstanding from the platen serve to hold the block against lateral displacement and to guide the same in its movement onto and off from the platen. In the present instance, the platen is mounted on the upper end of a vertical rod 22 slidable in a sleeve 23 in the base 20 and carrying at its lower end a piston 24 operating in a cylinder 25.

Upstanding from the corners of the base 20 and disposed on opposite sides of the platen 19 are posts 26 which provide vertical slideways 27 engageable with the corner portions 28 of the platen so as to effect accurate guiding of the latter in its vertical movement. The posts are rigidly connected at their upper ends by a super-structure 29 carrying plates 30 having hardened downwardly facing horizontal surfaces 31 against which the crank case flange 35 or bottom surface 32 of the block 10 is pressed to locate the same vertically in working position. Location of the block laterally is effected by two dowel pins 33 projecting downwardly from certain of the locating plates and having cylindrical base portions adapted to fit snugly in dowel holes 34 formed in the bottom of the block.

The bearing recesses in each web or end wall are, in the present instance, machined by a pair of cylindrical cutters 36 and 37 fast on parallel spindles 38 and 39 which project laterally from an arm or saddle 40 projecting downwardly from an elongated tool slide or carriage 41. The saddles are spaced along the slide to correspond to the spacing of the holes to be bored so that the saddles and the cutter thereon will enter the respective crank case openings and become positioned in proper alinement with the holes to be bored as the block is raised to working position as shown in Fig. 4. By locating the axes of the cutters 36 and 37 accurately with respect to the surface of the plates 31 and with respect to each other, it will be observed that the cutters will, as an incident to raising the block into its working position, be positioned with an extremely high degree of accuracy with respect to a point of reference on the block. To obtain this accuracy of position, it is only necessary to locate the block on the platen 19 with the dowel holes 34 approximately in alinement with the dowel pins 33 which are tapered at their lower ends so as to compensate for slight variations in the positioning of the block.

The tool slide 41 is of rigid construction and is supported at opposite side edges in spaced guideways 42 formed on the super-structure 29. The slide is thus adapted for endwise reciprocation parallel to the axes of the recesses to be bored so that if the block has been raised to working position, all of the holes in the webs of the different blocks and end walls will be bored simultaneously as the slide 41 is fed forwardly, that is, to the right as viewed in Fig. 1.

The cutters 36 and 37 on each of the saddles 40 are rotated from a common shaft 43 disposed externally of the block during the boring operation. Herein, the shaft is splined throughout its length and disposed in a channel 44 formed in and extending longitudinally of the slide 41 and defining a cylindrical surface which is interrupted at the lower side to form an opening through which drive connections may be extended to the different sets of cutters. Splined on the shaft 43 are spur gears 44ª meshing with gears 45 on the respective saddles 40. These latter gears in turn mesh with pinions 46 on the spindles 39. The cam shaft spindles 38 carry pinions 47 which mesh with gears 48 in turn meshing with the pinions 46. The cutter spindles are suitably journaled in anti-friction bearings supported by the saddles.

At spaced joints along its length, the shaft 43 is journaled in bearings 49 supported in the channel 44. Power for rotating the shaft 43 is transmitted thereto from a motor 51 mounted on the super-structure 29 and having its shaft connected to the shaft 43 through the medium of a belt 52.

A common tool slide 41 is employed for the two finishing machines. Any suitable means may be employed for feeding the tool slide in automatic cycles of feed and rapid traverse motions. Herein, one end of the slide is connected to a rod 54 carrying a piston 55 reciprocable within a cylinder 56 mounted on and disposed at one end of the frame super-structure 29. Pressure fluid delivered to a common feed line 57 by a constant volume pump 58 driven by a motor 59 is delivered through pipes 60 and 61 to the forward or rear end of the cylinder 56 according to the position of the movable member 62 of a two-way valve 63 connected to the armature 64 of a solenoid winding 65.

The valve 63 is of well known construction and is arranged in a manner such that when the winding 65 is deenergized, the member 64 will be positioned as shown connecting the supply line 57 to the pipe 61, pressure being thereby applied to the rear end of the cylinder 56 causing the tool slide 41 to be retracted to or maintained in starting position (Fig. 7), the pipe 60 being at this time connected to the drain pipe 66. When the solenoid 65 is energized, the position of the valve member is reversed, the pipe 61 being connected to the drain and pressure fluid being supplied through the pipe 60 to the forward end of the cylinder.

The rate of feed of the tool slide may be varied by regulating a valve indicated at 67 which controls the rate of fluid flow from the rear end of the cylinder. To provide for rapid approach movement of the tool slide, a branch pipe 68 is interposed in parallel with the valve 67 and connected to a shut-off valve 67ª, its member 69, when in the position shown in Fig. 7, is adapted to permit the free flow of fluid from the cylinder 56 through the unrestricted opening 69ª thereby causing rapid approach movement of the tool slide. After the initial advance of the slide, a cam 70 thereon engages a roller 71 on the valve member 69 shifting the latter to closed position thereby directing the flow of fluid through the valve 67 causing continued movement of the tool slide at the feed rate.

To elevate and lower the platens, the lower ends of the cylinders 25 in the finishing machines 12 and 13 are arranged to be connected by a valve 73 either to the supply line 57 or to the drain line 66. This is effected by energization and deenergization of a solenoid 74 the armature 75 of which is connected to the member 76 of the valve 73. The solenoid winding is normally energized and maintains a connection between the cylinders 25 and the drain line. When the solenoid is deenergized, the position of the valve member 76 is reversed and a pipe 77 is connected to the supply line 57 so that fluid will be delivered to the cylinders and the platens will be raised until the blocks thereon become clamped against the locating plates 30 where the blocks are maintained under the continued pressure applied to the pistons 24. The appropriate pressure relief valves 78 are included in the lines to insure the proper functioning of the circuits above described. Ball check valves 78ᵃ are also provided to permit the free entry of fluid past the rate valves.

The platens 19 constitute sections of the conveyor or slideway along which the blocks 10 are advanced through the successive machines 11, 12 and 13. In their lowermost positions, these conveyor sections are alined in end-to-end relation with each other and with horizontal sections 79, 80 and 81 thereby forming a continuous slideway extending through and beyond all of the machines. Herein the latter sections each comprise a pair of spaced bars 82 supporting rollers 83 providing horizontal supporting surfaces in the horizontal plane of the skid plates 18 on the platens. Preferably, the sections 80 and 81 between the roughing and semi-finishing machines are equipped with guide rails 84 to avoid the possibility of accidental lateral displacement.

The novel mechanism by which the blocks 10 are advanced along the slideway includes a shuttle or rod 85 extending alongside the blocks on the slideway and throughout the length of the latter and journaled at spaced points in brackets 86 on the posts 26 so as to be adapted for angular as well as endwise movement. Projecting laterally from the rod are pairs of rigid arms 87, the arms of each pair having parallel edges 88 facing toward each other and spaced apart a distance only slightly greater than the length of that portion of the block 10 adjacent the crank case flange. Thus, when the arms are swung upwardly and free of the blocks as shown in Fig. 6, the rod 85 may be moved axially without shifting the blocks along the slideway. When, however, the rod is turned clockwise as viewed in Fig. 6, the arms will be swung downwardly and thus positioned as shown in Fig. 5 and adapted for engagement with the ends of the blocks. By employing two arms for each block, the latter will always follow the movements of the rods and there will be no possibility of any of the blocks on the slideway becoming displaced relative to each other either accidentally or otherwise.

The different pairs of arms 87 are spaced relative to each other to correspond accurately to the longitudinal spacing of the blocks desired when the latter are in working positions in the different machines. Thus, by shifting the rod 85 to the right as viewed in Fig. 1 into a predetermined limit position in which a collar 89 on the rod engages the end of the bracket 86 (Fig. 1), the blocks on the platens 19 will be moved out of the respective machines and a new set of blocks will be advanced onto the platens and positioned with their dowel holes 34 in alinement with the lower ends of the dowel pins 33 of the respective machines. Likewise, when the rod is turned to move the arms 87 out of engaging relation with respect to the blocks and then retracted to its other limit position, the arms will be positioned for engagement with the next adjacent blocks. In this way, a series of blocks may be advanced through the different machines and stopped in proper positions preparatory to clamping, and all that is required of the machine operator is to place the blocks one-by-one on the conveyor section 79 and position the blocks thereon for proper engagement with the first set of arms 87. Suitable detent means (not shown) is provided for holding the transfer bar 85 yieldingly in either of its two angular positions.

To avoid the possibility of the blocks on the intermediate conveyor sections 80 and 81 becoming displaced accidentally, automatically operable means is provided for holding the blocks on these sections against endwise movement while the arms 87 of the transfer rod are out of engagement therewith. Herein this means comprises a series of arms or segments 90 rigid with and projecting laterally from a tube 91 surrounding the rod and rotatably supported at opposite ends on the adjacent posts 26 of the machines 11 and 12. The tube has a longitudinal slot 92 through which the arms 87 project, the tube being thus adapted to turn with the rod by permitting independent axial shifting of the latter. The spacing of the arms 90 is the same as that of the transfer arms 87 and their angular position is such that when the transfer arms are swung downwardly into engaging relation with respect to the blocks, the arms 90 will be disposed below the blocks and the latter will be free for movement with the transfer rod. However, when the rod 85 is turned to swing the arms 87 upwardly as shown in Fig. 6, the arms 90 will be swung upwardly along opposite ends of the blocks thereby positively holding these blocks against endwise movement while the transfer arms are out of engagement with the blocks.

Preferably, the transfer rod 85 is reciprocated by power from the same source as that used to actuate the tool slides and platens. For this purpose a cylinder 93 is mounted on the finishing machine 13 alongside the rod and has therein a piston 94 (Fig. 7) on a rod 95, the projecting end of which is rigidly connected by a cross bar 96 to the end of the transfer rod 85. Fluid from the supply line 57 is delivered through pipes 97 and 98 to one end or the other of the cylinder 93 under the control of a two-position valve 99 having a member 100 shiftable into one of two positions according to whether or not a solenoid 101 is energized. When the solenoid is energized, pressure fluid is supplied to the cylinder 93 through the pipe 97 so that the transfer bar will be shifted to the right thereby advancing the blocks along the conveyor. The connections are reversed when the solenoid becomes deenergized, thereby causing the rod 85 to be retracted to starting position which is determined by the travel of the piston 94.

In order to prevent the substantial amount of chips formed during the operation of the roughing machine 11 from interfering with the normal operation of the semi-finishing and finishing machines 12 and 13, provision is made for removing the chips from the block after it has been advanced out of the roughing machine. This may be accomplished, for example, by tilting each block about an axis extending longitudinally thereof while the block is supported on the conveyor section 80. To this end, the section 80 is mounted on a plate 102 (Fig. 5) fast on a shaft 103 which extends along the center line of the block slideway but is disposed therebelow and is journaled in bearings supported by a base 104. Upstanding from the plate 102 are bracket arms 105 which overlie the block at opposite ends thereof and hold the same in place on the section 80 while the latter is being tilted to dump the chips. During this tilting movement the block is moved between two curved rails 106 supported from the base 104 and acting to hold the block against endwise movement. Tilting of the plate 102 is effected by a reversible motor 107 operating through worm gearing 108 and spur gearing 109 to oscillate a gear 110 fast on the shaft 103.

Operation of the motor 107 is controlled by solenoid switches 111 and 112, the motor running, when the switch 111 is closed, in a direction to turn the plate 102 clockwise. The energizing circuit for the latter switch extends from the power line L3 (Fig. 8) through a conductor 113 having a manually operable switch 114 therein, the solenoid winding 115, a conductor 116, a switch 117 which is closed momentarily as one of the platens 19 rises, conductors 118 and 119, a switch 120 which is closed whenever the plate 102 of the dumping fixture is in normal horizontal position, and a conductor 121 leading to the line L1. Closure of the switch 117 occurs as a dog 122 pivoted on one platen 19 engages a follower 123 carrying the movable contact of the switch. As the platen is lowered, the dog tilts against the action of a spring 124 and does not close the switch. The switch 120, which is of the snap type, is housed in a casing 125 (Fig. 5) and its operating lever 126 is connected to a vertical rod 127 which is normally depressed by the plate 102 maintaining the switch 120 closed. Energization of the winding 115 is maintained through a sealing circuit including a switch 128 in parallel with the switch 117 and closed whenever the winding 115 is energized.

After the plate 102 carrying the rough bored block has been tilted through a half revolution, a pin 129 on the bracket 105 engages the actuating lever 126 opening the switch 120 and closing a switch 130 which completes the circuit for energizing the winding 131 of the solenoid switch 112. Rotation of the motor 107 is then reversed causing the plate to be turned back to normal position. As this position is approached, the plate depresses the rod 127 thereby opening the switch 130 to stop the motor and also close the switch 120 preparatory to the next operation of the block tilting mechanism. When the block has been inverted by tilting of the blade 102, air blasts from nozzles 132 are directed into the casting to remove any chips that might remain on the parts of the block.

Referring now to the wiring diagram (Fig. 8), the pump motor 59 and the drive motor 51 are energized from the power lines L1, L2 and L3 by solenoid switches 133 and 134. The winding 135 of the switch 134 is energized through a circuit extending from the line L3 through conductors 136 and 137, the winding 135, a conductor 138, a normally open manually operable switch 139, a conductor 140 having a normally closed manually operable emergency stop switch 141 therein, and a conductor 142 to the line L1. After initial energization, the solenoid switch is maintained closed through a sealing switch 143 in parallel with the start switch 139. The energizing circuit for the solenoid switch 133 extends through a normally closed stop switch 144 and either the manual switch 139 or the maintaining switch 143.

The solenoid coil 101 by which the transfer bar actuator is controlled is governed by a circuit extending from the line L3 through the coil 101, a switch 145 which is closed when a solenoid 146 is energized, and a conductor 147 leading to the line L1. The circuit of the solenoid 146 extends through a conductor 148, a normally closed switch 149, a normally open switch 150 adapted to be closed by depressing a push button on the roughing machine 10, a conductor 119 and the switch 120 which is closed when the conveyor section 80 is in normal horizontal position. In the advanced position of the transfer rod, a cam 151 (Fig. 7) thereon is brought into operative relation to a follower 152 connected to the movable contact of the switch 149. Thus, when the rod is turned counter-clockwise to raise the arms 87 out of engagement with the blocks, the cam 151 depresses the follower as shown in Fig. 6 thereby opening the switch. After initial energization, the solenoid 146 is maintained energized through a circuit which extends from the line L3 through the winding, the conductor 148, the switch 149, a conductor 153, the then closed switch 154, conductors 155 and 156, a switch 157 which is closed when the pump motor switches 133 are closed, the conductor 142 to the line L1.

Energization of the platen valve solenoid 74 is controlled by either of two circuits, one extending from the line L3 through the coil 74, a conductor 158, a switch 159 which is closed when a solenoid 160 is energized, a conductor 161, a switch 162 which is closed when the platen 19 is in its lowermost position, the conductors 163 and 156, the switch 157, the conductor 142 to the line L1. The movable contact of the switch 162 is on a follower 164 (Fig. 4) pivoted on the machine frame in the path of a cam 165 on the platen which cam opens the switch in the initial upward movement of the platen. The energizing circuit for the solenoid 160 extends from the line L3, through the solenoid coil, a conductor 166, a normally closed switch 167, a conductor 168, the conductor 156, the switch 157, and the conductor 142 to the line L1. The movable contact of the switch 167 is actuated by a lever 167a positioned to be struck and moved to switch open position by the collar 89 on the transfer rod 85 when the latter reaches its extreme right hand or advanced position.

The second energizing circuit for the solenoid 74 extends from the coil thereof through a conductor 169, a switch 170 which is closed when a solenoid 171 is energized, the conductor 156 through the switch 157 and conductor 142 to the line L1. The winding of the solenoid 171 is energized initially through a circuit extending through a conductor 172, a switch 173 which is closed as the tool slide completes its return movement, conductors 174 and 175, a switch 176 actuated by the platen cam 165, conductors 163 and 156 and thence to the line L1. Closure of the switch 173 is effected by a lever 177 fulcrumed on a fixed pivot and having an arm 178 positioned to be engaged by a pivoted dog 179 on the tool slide 41 as the latter approaches starting position in moving to the left as viewed in Fig. 7. Thus, as the dog passes the arm 178 while held by a pin 180 against pivoting, the lever 177 is moved to close the switch 173. In the reverse movement of the tool slide 41, the dog rides over the arm without effect. The winding 171 is maintained energized by a switch 171a which is closed when the winding is energized, and is connected in parallel with the switch 173.

The present invention contemplates the provision, in all of the machines 10, 11 and 12, of means for disabling the tool slide actuator against forward movement until the blocks have been brought into proper association with the locating dowels, that is, the lower ends of the pins 33 have entered the dowel holes 34. In the case of the finishing machines 12 and 13, the disabling means is constructed to act in response to the presence of chips or other foreign matter on the upper surfaces of the blocks which chips would prevent the latter from abutting properly against the locating means 30. Herein this disabling means comprises a plurality, four for each block in the present instance, of switches 181 interposed in series relation in the energizing circuit of the winding 182 of a solenoid which controls the tool slide, said switches having actuating elements positioned for engagement with spaced points on the crank case flange 35 as the block is moved within approximately one one-thousandth of an inch of the locating plate surfaces 31. So long as any one of these switches remains open, energization of the solenoid 182 will be prevented thereby maintaining open a switch 183 which controls the circuit by which the solenoid 65 is energized.

While the sensitive switches may be of any desired construction, they are shown in Figs. 2 and 4 as comprising two contacts 184 mounted within a casing 185 on the super structure 29 and a movable contact 186 bearing against the free end of a lever 187 pivoted at 188 and bearing intermediate its ends against an adjusting screw 189 on the end of a second longer lever 190. The latter is pivoted at 191 on the frame 29 and near its fulcrum carries a feeler in the form of a projection 192 accurately disposed slightly below the lower surface 31 of the locating plates so as to be engaged by the crank case flange in the final increment of movement of the opposed portion of the block surface 32 into abutment with the surface 31. Through the multiplying levers thus provided, the switches 181 may, by proper adjustment, be arranged to respond to a movement of the projection 192 on the order of one one-thousandth of an inch. Preferably, the four levers 190 for each block are widely spaced apart. As shown in Fig. 2, two of the feelers 192 will engage the flange surface 32 on each side of the block flange 35 near opposite ends thereof.

In view of the high degree of sensitivity of the switches 181, the presence of chips or other foreign matter on any part of the crank case flange surface 32 as the block is being elevated to working position will be detected as evidenced by failure of some one portion of the flange surface opposite at least one of the feelers 192 to come within approximately one one-thousandth of an inch of the locating surfaces 31 and close the corresponding switch 181. Failure of any one switch to close will prevent energization of the solenoid 182 and advance of the tool slide at the intended time. Since the feelers 192 cannot be engaged until after the dowel means on the block and locating plates have interengaged properly, the switches 181 also serve to disable the tool slide in the event that the block is not positioned on the platen with sufficient accuracy to enable the dowels to function as intended.

In addition to the eight series switches 181, the energizing circuit for the solenoid 182 includes a conductor 193, a switch 194 which is closed only after the block has been clamped against the plates 30 under the desired pressure, a normally closed manually operable switch, and a conductor 195 having therein a switch 196 of the snap type which is actuated by the tool slide 41, being shifted to closed position when the slide returns to starting position and to open position as the slide completes its feed movement. This is accomplished by mounting the housing 197 (Fig. 7) for the switch 196 on the frame 29 with a rod 198 carrying the movable switch contact positioned for engagement with adjustable stops 199 and 200 (Figs. 7 and 8) on the slide 41.

To detect correct final clamping of the block in working position, the movable contact of the switch 194 is on a piston 201 in a cylinder 202 communicating with the platen cylinder. By properly pre-loading the piston, the switch 194 is arranged to remain open under the pressure developed in the platen cylinder while the block is being elevated but to become closed in response to a predetermined higher pressure which builds up in the cylinder after the block engages the locating plates 30 and is held clamped thereagainst.

In the roughing machine 11, substantially all of the parts of the hydraulic and electrical control circuits above described are duplicated except for the solenoid 146 which is equipped with a switch 210 which controls the transfer bar solenoid 101 of the roughing machine.

An indicator is provided to enable an operator standing near the loading station to readily detect a failure of the finishing machines to go through the cycle in the normal way. The indicator may take the form of electric signal lamps 203 (Figs. 1 and 8) mounted on the machine 12 in a suitable place and arranged to be turned on by closure of a switch 204. The movable contact of the latter is on a follower 205 (Fig. 7) which is engaged by a cam 206 on the tool slide 41 in the initial movement of the latter. The arm maintains the switch open when the slide is returned to starting position and closes the switch when the slide starts to move. Failure of the lights to be turned on during the normal boring operation will thus indicate to the operator that the machine is not functioning properly.

*Operation*

The machines above described operate in the following manner assuming that the transfer bar 85 and the tool slides are fully retracted and the platens 19 lowered. The operator first closes the push button switch 139 which effects closure of the solenoid switches 133 and 134 to start the pump motor 60 and the tool drive motor 51. The solenoids 74 and 160 thus become energized through the switch 157 so as to maintain the valve 73 positioned to connect the pipe 77 to the drain line, the platens thereby remaining in their lowermost positions. All of the parts are then positioned as shown in Figs. 7 and 8.

The operator first grasps the handle 85ª and turns the transfer rod 85 counter-clockwise as viewed in Fig. 7 to swing the arms 87 down into engaging relation with respect to the different blocks. Then, the push button switch 150 is closed thereby energizing the solenoid 146 through the then closed switches 120 and 149. This closes the switch 145 which energizes the solenoid 101 operating the valve 99 to permit pressure fluid to flow into the forward end of the cylinder 93.

As a result, the transfer bar 85 is shifted to the right as viewed in Fig. 1 and all of the blocks 10 along the slideway are advanced one step, energization of the solenoid 146 being maintained through the switches 149, 154 and 157. When the transfer rod 85 reaches its limit of travel, the collar 89 opens the switch 167 thereby deenergizing the solenoid 160 which opens the switch 159 and in turn deenergizing the solenoid 74 which permits movement of the valve member 76 to connect the supply line 57 with the pipe 77. Fluid is thus delivered to the platen cylinders 25 thereby starting upward movement of the platens and the blocks thereon. In this initial movement, the cam 165 closes the switch 176 to prepare the circuit for energizing the solenoid 171 in the latter part of the cycle and opens the switch 162 which maintains the solenoid 74 deenergized.

A dog 122 effects momentary closure of the switch 117 in the upward movement of the platen thereby initiating a cycle of operation of the turnover fixture for tilting the conveyor section 80. The motor 107 of the tilting mechanism goes through an independent cycle and stops automatically independently of the operation of the other parts.

If the blocks 10 on the different platens are positioned properly and their upper surfaces 32 are free from chips or other foreign material, the dowel pins 33 will, as the blocks approach the locating plates 30, enter the dowel holes 34 guiding the block into proper position as it reaches the locating surfaces. The cutters 36 and 37 are thus located properly with respect to the holes to be bored thereby. In the final movements of the blocks, the surfaces 32 thereon engage all of the projections 192 thereby closing the switches 181. Then, as the pressure in the platen cylinder builds up following engagement of the locating surfaces and the clamping of the block thereagainst, the switch 194 becomes closed completing the circuit for energizing the solenoid 182 through the eight then closed switches 181 and the then closed switch 196. As a result, the switch 183 is closed completing the energizing circuit for the solenoid 65 which shifts the valve member 62 into a position to connect the supply line 57 to the forward end of the cylinder. Forward movement of the tool slide 41 is thus initiated at rapid traverse rate and continues until the cam 76 actuates the valve member 69 to close the outlet pipe 68 and direct the discharge fluid through the restricted opening of the valve 67, movement of the slide continuing at the feed rate. At this time, the cutters 36 and 37 enter the openings 14 and 15 in the blocks and perform the boring operations.

While the boring operation is in progress, the operator usually loads a new block onto the conveyor section 79. The transfer bar arms 87 may then be rotated upwardly out of engagement with the blocks 10 in the machine and on the sections 81 and 80, the latter blocks being then held in proper position by the arms 90. In such rotation of the bar 85, the cam 151 on the collar 89 depresses the follower 152 thereby opening the switch 149 and interrupting the circuit to the transfer bar control solenoid 146. The switch 145, which is opened when the solenoid 146 is deenergized, breaks the circuit to the solenoid 101 permitting the member 100 of the valve 99 to shift back to the position shown in Fig. 7 causing pressure fluid to be directed through the pipe 98 into the rear of the cylinder 93. The transfer rod 85 is thus retracted to starting position (Fig. 7), movement thereof being arrested when the piston 94 reaches the end of the cylinder. As the collar 89 moves away from the bracket 86, the switch 167 is permitted to close completing the circuit to the solenoid 160, energizing the same and thus closing the switch 159. In order that the transfer rod may be detracted without causing the platens to be lowered when the switch 159 closes, the switch 162 is arranged in the initial energizing circuit of the solenoid 74. Since the switch is opened in the initial upward movement of the platen, it prevents the solenoid 74 from being energized when the switch 167 becomes closed. It will be seen that interlocking means has been provided which permits the transfer rod to be returned at any time in the boring cycle and which prevents the lowering of the platens until the tool slide has returned to a proper position as will now appear.

At the completion of the boring operation, the stop 199 on the slide 41 engages the rod 198 and opens the switch 196 thus interrupting the circuit of the solenoid 182. Deenergization of the coil 182 permits the switch 183 to open and deenergize the coil 65. The member 62 of the valve 63 is shifted to the position shown in Fig. 7 thereby directing pressure fluid into the pipe 61. The ball check valve 78ª shunted around the rate valve 67 permits the free flow of fluid pressure to the rear end of the cylinder to rapidly return the cutter slide 41 to the starting position which is determined by the limit position of the piston 55 in its cylinder.

The return of the tool slide to its initial position causes the projection 200 to engage the follower 198 and close the switch 196. The circuit including the solenoid 182 is thereby conditioned for the next cycle. In order to prevent recycling of the tool slide 41 at this time, means is provided to disable the circuit to the solenoid 182 before the switch 196 is closed. This is accomplished by including the pressure switch 194 in the circuit and starting to lower the platens before the slide is completely returned.

Thus near the end of the return movement of the tool slide 41, the dog 179 thereon strikes the arm 178 causing the lever 177 to rock about its pivot and close the switch 173. A circuit is thereby completed through the then closed switch 176 and the solenoid 171 is energized resulting in closure of the switch 170, continued energization of the solenoid 171 being maintained through the locking circuit including the switches 171ª and 176, the latter remaining closed by the cam 165. This completes a circuit to reenergize the platen solenoid 74 thus moving the valve member 76 to the position shown in Fig. 7 and connecting the pipe 77 to the drain. The pressure in the cylinder 202 will thereupon diminish thus allowing the switch 194 to open. The platen will then be lowered during which time the cam 165 permits the switch 176 to open and the switch 162 to close. Closure of the switch 162 again completes the circuit to the solenoid 74 through the then closed switch 159. Thus the platen upon reaching its lowermost position will remain there until the switch 167 is again opened in the next cycle.

As soon as the platens are completely lowered, the cycle push button 150 may be depressed and another cycle initiated. During the ensuing cycle the new block will be moved into the machine 11 and the finished block in the machine 13 moved out onto the conveyor while the intermediate blocks are also all advanced one position.

The several manual switches provided are for the convenience of the operator or for emergencies. The switch 144 may be opened, for instance, during the setting up or tooling of the machine when only the drive motor 51 is required. The switch 114 may be opened to disable the turnover motor 107 in the event its operation is not required. The switch 211 connected in series with the switches 181, 194 and 196 provides a means for deenergizing the solenoids 182 and 65. Deenergization of the solenoid 65 shifts the member 62 as previously described. Thus the tool slide may be retracted at any time during the boring cycle that the operator may find it necessary.

From the foregoing, it will be seen that the operating mechanisms for the transfer bar 85, the platens 19 and the tool slides 41 are so interlocked as to insure operation in proper sequence under all conditions and in spite of the possibility of error on the part of the operator in actuating the controls. Also advance of the tool slide 41 is effectually prevented in the event that the dowel pins 33 do not properly enter the dowel holes in the block as it is being elevated or in the event that there is any foreign matter on the upper surface of the crank case flange or on the lower surfaces of the locating plates when the block approaches its uppermost or working position. In such events, owing to the extremely sensitive character of the switches 181, one or more of the latter will remain open thereby disabling the tool slide actuator. The failure of the tool slide 41 of either the roughing or finishing machines to advance at the proper time will be indicated by the signal lamps 203 on these machines.

When the tool slide actuator becomes disabled, the cause of the difficulty may be remedied by depressing a laterally extending rod 177ª (Figs. 1 and 7). This rod is located to move the lever 177 when pushed inwardly by the operator, thereby closing the switch 173 to effect energization of the solenoid 171 in the same way or in the regular cycle. The solenoid 74 is thus energized by closing of the switch 170, the member 76 of the valve 73 being shifted to connect the platen cylinders 25 to the drain. It will be necessary, however, for the operator to raise the arms 87 of the transfer rod 85 thereby closing the switch 149 and causing the same to return to its initial position. As the transfer bar moves away from the bracket 86 the switch 167 will be closed thus permitting the energization of the solenoid 74 to be transferred to the solenoid 160 during the descent of the platens. After the platens have reached their lowermost positions, the surfaces of the locating plates 30 and the block may be cleaned and the cycle initiated in the regular way by closing the switch 150, whereupon the previously positioned blocks will be operated upon. In this case, however, it will not be necessary to advance a new set of blocks into the machine so that the operator will leave the transfer rod arms 87 in their upright positions and the transfer rod will thus go through an idle motion. After the switch 167 has been opened, the remainder of the cycle will take place as previously described.

I claim as my invention:

1. A machine tool having, in combination, a vertically movable support on which a work piece may be mounted, accurately located downwardly facing abutment surfaces positioned to engage a surface of the work piece as said support is elevated, hydraulically actuated means adapted when supplied with pressure fluid to elevate said support and clamp the work piece thereon in working position against said abutment surfaces preparatory to machining the work piece, dowel means associated with said abutment surfaces and interengaging with complemental dowel means on the work piece to effect accurate location of the work piece laterally as it approaches said abutment surfaces, a tool for performing a machining operation on the positioned work piece, a device responsive to the final movement of said work piece following interengagement of said dowel means, a device arranged to detect a predetermined pressure built up in said hydraulic means following engagement of said work piece and abutment surfaces, and power actuated mechanism controlled by the joint action of said devices and operating in response thereto to effect relative feeding movement between said tool and work piece.

2. A machine tool having, in combination, a work locating abutment, means for moving a work piece to be machined toward said abutment to bring a surface on the work piece into engagement with a surface on the abutment and thereby locate the piece in position to be operated upon, at least three independently operable devices responsive to the final increment of movement of points on the work piece surface spaced laterally thereof in two transverse directions, and means controlled by all of said devices to detect full contact between said surfaces at all of said points or spacing of said surfaces greater than a few thousandths of an inch whereby to indicate the absence or the presence of foreign matter at any one of the points.

3. A machine tool organization having, in combination, an elongated conveyor for supporting a succession of work pieces in spaced relation, a plurality of machines spaced along said conveyor and adapted to perform material removing operations on the successive work pieces presented thereto, a rod extending longitudinally of the conveyor and mounted for endwise reciprocation, said rod also being movable angularly between two positions, and a plurality of shoulders rigid with and extending laterally from said rod and spaced therealong distances greater than the length of the work pieces, said shoulders being engageable with the respective work pieces when said rod is in one of said positions but being free of the work pieces when the rod is in the other of said positions.

4. A machine tool organization having, in combination, an elongated conveyor for supporting a succession of work pieces in spaced relation, a plurality of machines spaced along said conveyor and adapted to perform material removing operations on the successive work pieces presented thereto, a rod extending longitudinally of the conveyor and mounted for endwise reciprocation, said rod also being movable angularly between two positions, a plurality of laterally extending shoulders rigid with said rod and spaced therealong distances greater than the length of the work pieces, said shoulders, when said rod is in one of said angular positions, being engageable with corresponding ends of the successive work pieces whereby all of said pieces will be advanced along the conveyor during endwise movement of the rod in one direction, and another set of shoulders on said rod occupying substantially the same angular position as said first mentioned shoulders and each spaced along the rod a distance slightly greater than the length of said work piece whereby each pair of first and second shoulders maintains one work piece positively against substantial movement relative to said rod when the shoulders are in said first mentioned position.

5. The combination with a conveyor for supporting a succession of work pieces of an elongated bar extending longitudinally of said conveyor and mounted for endwise and also for angular movement, and a plurality of spaced pairs of shoulders rigid with and projecting laterally from said rod, the shoulders of each pair being spaced for engagement with opposite ends of a work piece whereby to hold each work piece positively against movement relative to said rod when the latter is in one angular position, and said rod being retractible independently of the work pieces when swung to a position to disengage the shoulders from the work pieces.

6. The combination with a conveyor for supporting a succession of work pieces, of an elongated member reciprocable longitudinally of said conveyor, lateral shoulders on said member to engage the respective work pieces and advance the same along the conveyor upon movement of the member in one direction, said shoulders being arranged to pass the work pieces upon retraction of said member, a second set of shoulders spaced from the corresponding shoulders of the first set and acting while the latter shoulders are in engagement with the work pieces to positively prevent relative movement between the work pieces and the member in a direction longitudinally of the latter, and means acting automatically as an incident to retraction of said member to hold certain of said work pieces positively against movement longitudinally of said conveyor.

7. The combination with a conveyor for supporting a succession of work pieces of an elongated bar extending longitudinally of said conveyor and mounted for endwise movement and also for angular movement between two positions, members on said bar adapted for engagement with the respective work pieces when the bar is in one of said angular positions whereby to advance the work pieces along said conveyor when said bar is moved endwise, said bar being retractible independently when in the second angular position, a second bar mounted for angular movement with said first mentioned bar but held against longitudinal movement, and shoulders on said second bar moved into and out of engaging relation with respect to said work pieces as incidents to the movements of said members out of and into engagement with the work pieces.

8. A machine tool organization having, in combination, a conveyor along which work pieces may be advanced, two similarly constructed machines arranged in spaced relation along said conveyor and adapted to perform roughing and finishing operations successively on the same portions of each work piece advanced along said conveyor, and mechanism operating automatically on each of said work pieces at a point between said machines to tilt the work piece relative to said conveyor and out of the position it normally occupies in passing along said conveyor and remove therefrom chips that may be retained thereon after the work piece leaves said roughing machine.

9. A machine tool having, in combination, a supporting table for a work piece, a member against which the work piece is clamped during operation thereon, a tool for operating upon said work piece, power driven mechanism for relatively moving said table and clamping member toward each other, a control element movable from an inactive to an active position to initiate operation of said mechanism, and feeler arms on said element movable along opposite sides of said work piece in the movement of said control element from inactive to active position when the work piece is correctly positioned on said table, said arms engaging the work piece and preventing effective operation of the control element when the work piece is incorrectly positioned.

10. A machine tool having, in combination, a horizontal table onto which a work piece may be supported, tools above said work table for operating upon said work piece mounted on the table, power driven mechanism by which said table may be elevated to bring a work piece thereon into operative association with said tools, a control member movable from inactive to active position to initiate operation of said mechanism, and a feeler on said member arranged to move past the work piece in the movement of said control member from inactive to active position when the work piece is in a definite position on said table, but to be blocked by the work piece in any other position thereof whereby to prevent effective operation of said member when the work piece is incorrectly positioned.

11. A machine tool having, in combination, three or more work locating abutments spaced for engagement with widely spaced points on one side of a work piece to be machined, means for moving the work piece toward and against said abutments to locate the piece in position to be operated upon, three or more independently operable feelers one disposed closely adjacent each of said abutments and responsive to the final increment of movement of corresponding points on the work piece surface and devices actuated by the respective feelers and operating to detect full contact of the work piece with each of said abutments or separation thereof from the abutments by more than a few thousandths of an inch whereby to indicate the absence or the presence of foreign matter at any one of the points, and mechanism controlled by the joint action of said devices for machining the located work piece, said mechanism being disabled against effective operation when any one of said devices is not actuated.

12. A machine tool for operating on a work piece having, in combination, a plurality of abutments positioned for engagement with points spaced around one side surface of said work piece, power operated means for moving the work piece and abutments toward each other and into abutting engagement, three or more independently movable feelers projecting beyond said abutments for engagement with widely spaced portions of the work surface in the final movement of the work piece against said abutments, a control switch for each of said feelers sensitive to movements of a few thousandths of an inch, connections between the feelers and the respective switches operable to amplify the motions of the former and cause opening or closing of the switch in response to feeler movements sufficiently small to detect the presence or absence of fine chips between said abutments and said work surface, a tool for operating on the clamped work piece, power driven mechanism for effecting relative feeding movement between said tool and work piece, and means controlled by the joint action of said switches to govern effective operation of said feeding mechanism.

13. A machine tool having, in combination, a support mounted for vertical movement and having a surface on which a work piece may be supported, a downwardly facing abutment against which an upwardly facing surface of a work piece on said support will be clamped as the support is elevated, a tool, a support for said tool movable in a direction other than vertical to cause the tool to perform a metal-removing operation on a work piece clamped against said abutment, power actuated mechanism for feeding said tool support, a movable feeler projecting below said abutment for engagement with the work piece in the final increment of upward movement thereof, a control device sensitive to movements of its movable element of a few thousandths of an inch and controlling the operation of said mechanism, and a connection between said feeler and said movable element operable to multiply the motion of the feeler several times and render said device sensitive to a final work piece movement sufficiently small to maintain said mechanism disabled in the event that the work and abutment surfaces are separated by fine chips or the like after clamping of the work piece.

14. A machine tool for operating on a work piece having, in combination, a plurality of abutments positioned for engagement with points spaced around one side surface of said work piece, means for moving the work piece and abutments toward each other and into abutting engagement, a feeler projecting beyond said abutment for engagement with the work surface in the final movement of the work piece against said abutments, a control switch sensitive to movements of a few thousandths of an inch, a connection between the feeler and said switch operable to amplify the motion of the former several times and cause opening or closing of the switch in response to a feeler movement sufficiently small to detect the presence or absence of fine chips between said abutments and said work surface, a tool for operating on the clamped work piece, power driven mechanism for effecting relative feeding movement between said tool and work piece, and means controlled by said switch to govern effective operation of said feeding mechanism.

15. A machine tool organization having, in combination, a conveyor along which work pieces may be advanced, two operating stations and an intervening idle station spaced along said conveyor, mechanisms at said operating stations for performing metal removing operations on work pieces at rest in such stations, means by which a plurality of work pieces may be advanced simultaneously along said conveyor to advance work pieces from one station to the next, and power operated mechanism at said idle station operable on a work piece resting therein while said metal removing mechanisms are operating to move such work piece out of and back into its normal idle position relative to said conveyor in a manner such as to remove chips formed at the first operating station and accumulated on the work piece in positions to interfere with location, clamping, and machining of the work piece in the second station.

FREDERICK J. KAMPMEIER.